July 11, 1939.  R. C. WINDERS  2,165,600
COIL SPRING FORMING MACHINE
Filed Dec. 3, 1937  8 Sheets-Sheet 1
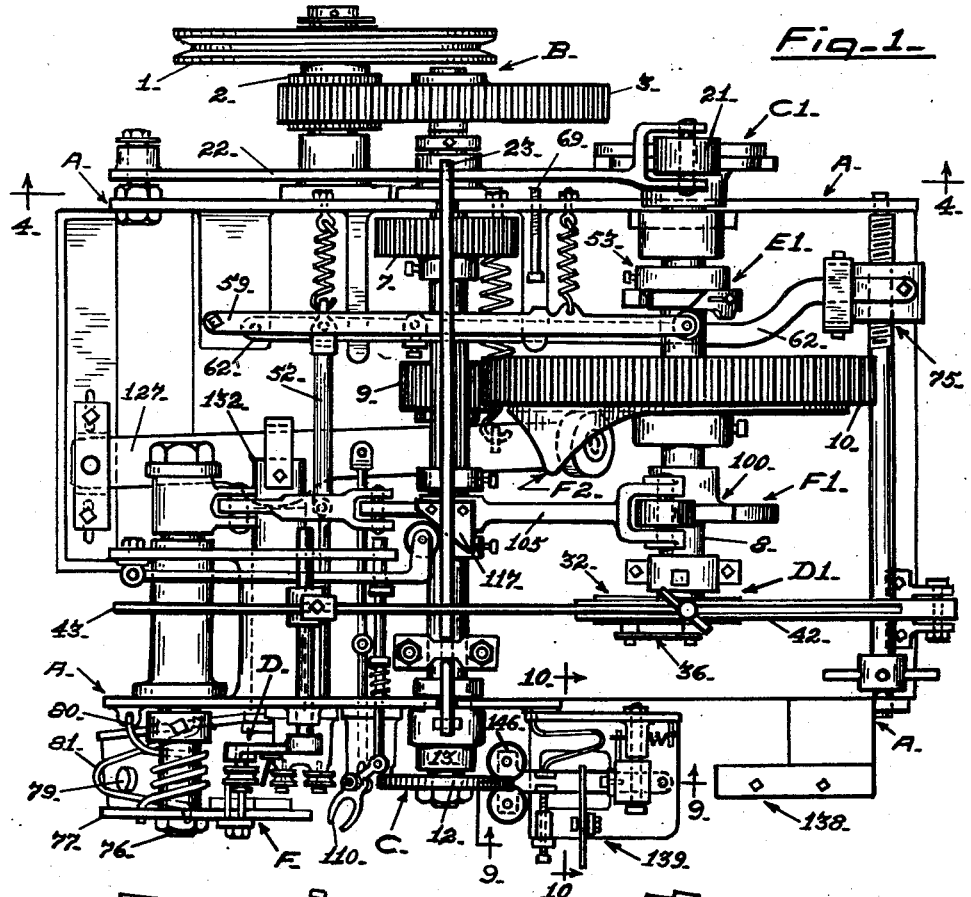
Fig-1-
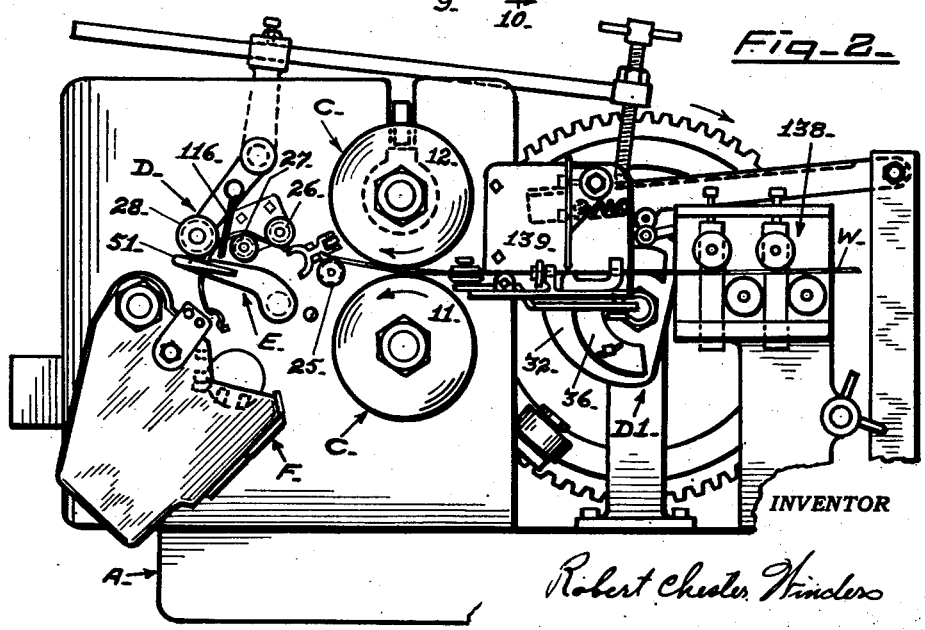
Fig-2-
INVENTOR
Robert Chester Winders July 11, 1939.       R. C. WINDERS       2,165,600
COIL SPRING FORMING MACHINE
Filed Dec. 3, 1937        8 Sheets-Sheet 2

INVENTOR
Robert Chester Winders

July 11, 1939.   R. C. WINDERS   2,165,600
COIL SPRING FORMING MACHINE
Filed Dec. 3, 1937   8 Sheets-Sheet 3

INVENTOR
Robert Chester Winders

July 11, 1939.   R. C. WINDERS   2,165,600
COIL SPRING FORMING MACHINE
Filed Dec. 3, 1937   8 Sheets-Sheet 4
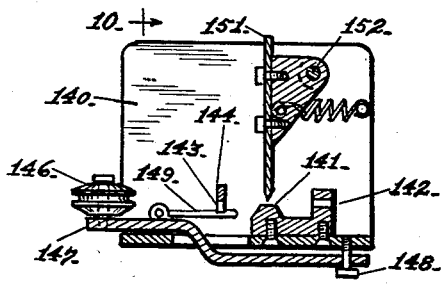
Fig. 9.
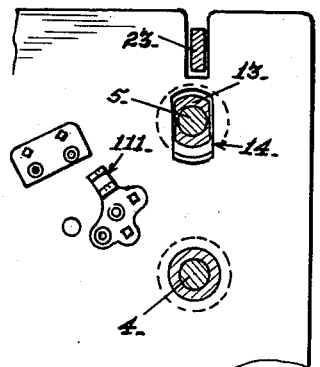
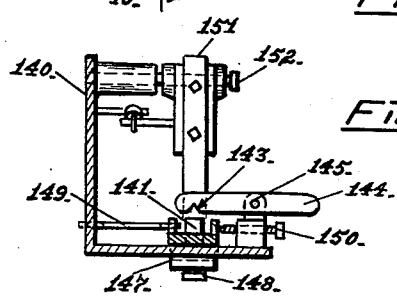
Fig. 10.
Fig. 11.
Fig. 12.   Fig. 13.
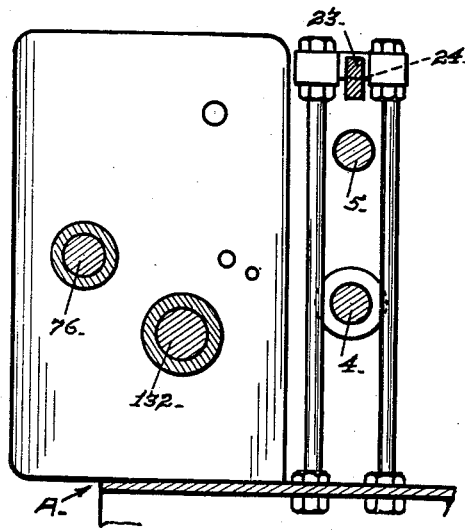
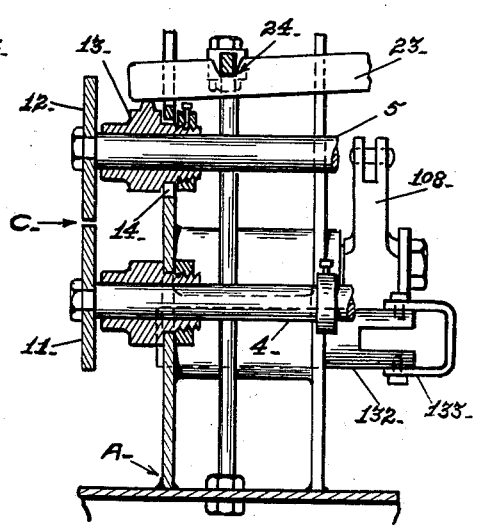
Fig. 16.
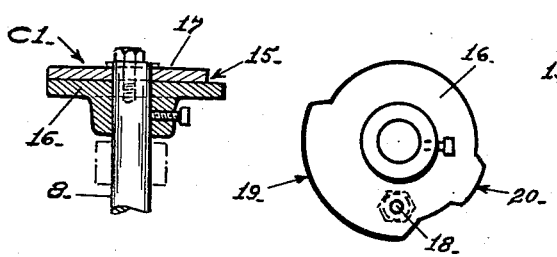
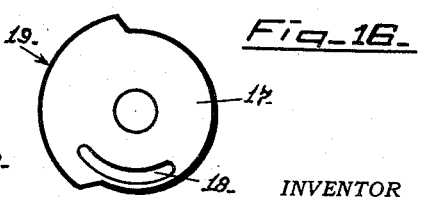
Fig. 14.   Fig. 15.
INVENTOR
Robert Chester Winders

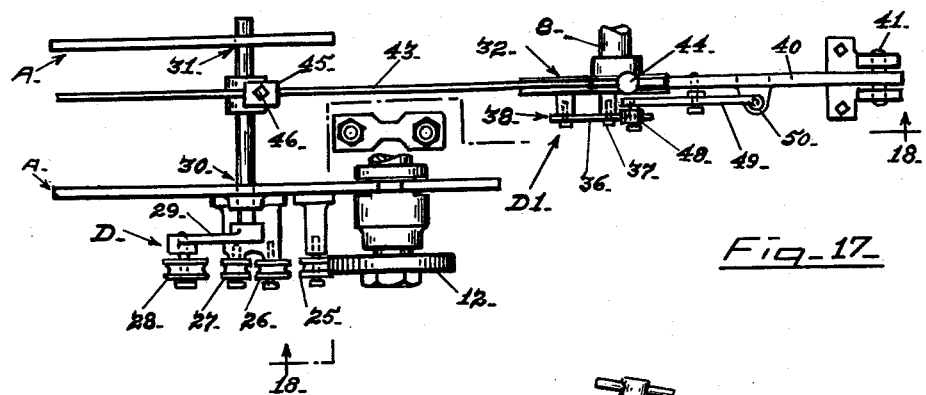
Fig_17
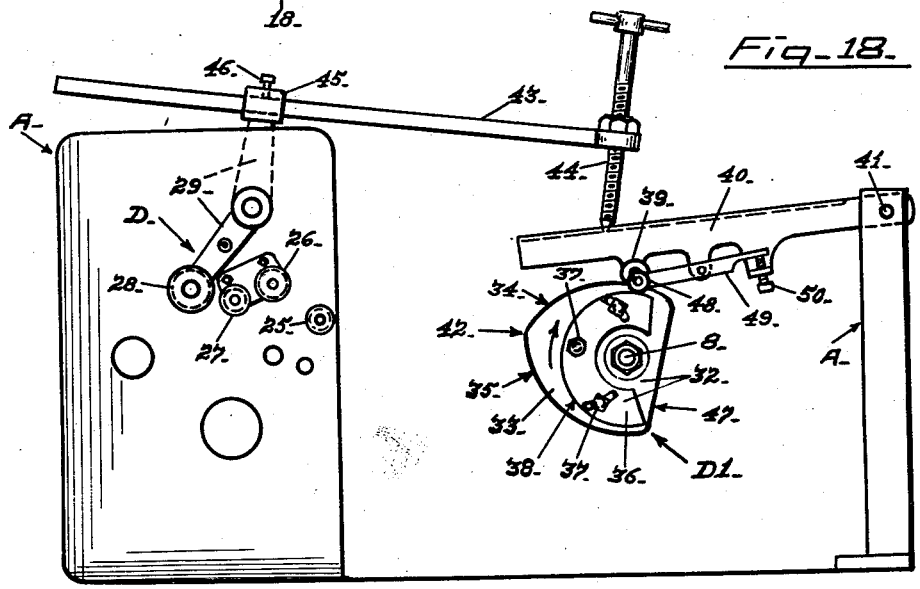
Fig_18
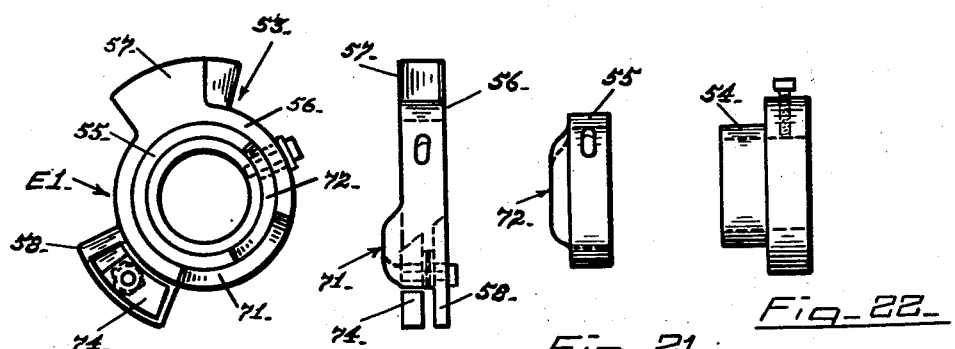
Fig_19  Fig_20  Fig_21  Fig_22
INVENTOR
Robert Chester Winders

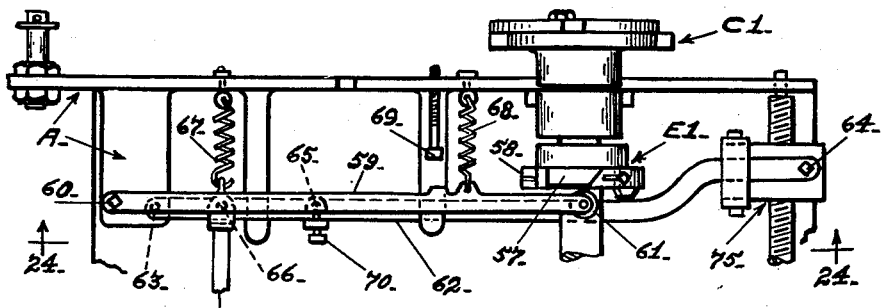
Fig_23.
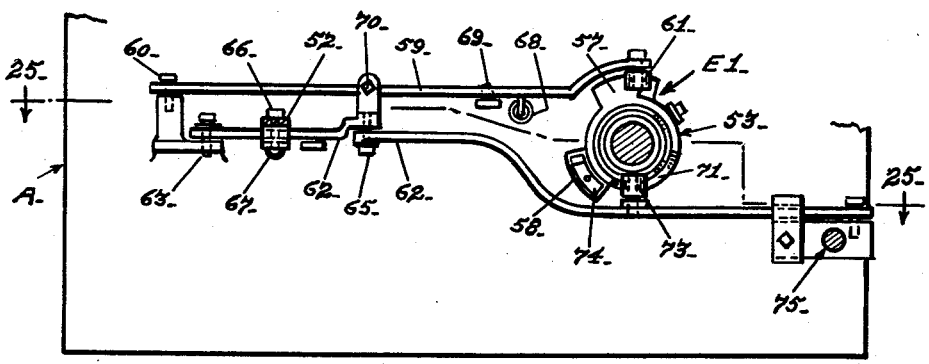
Fig_24.
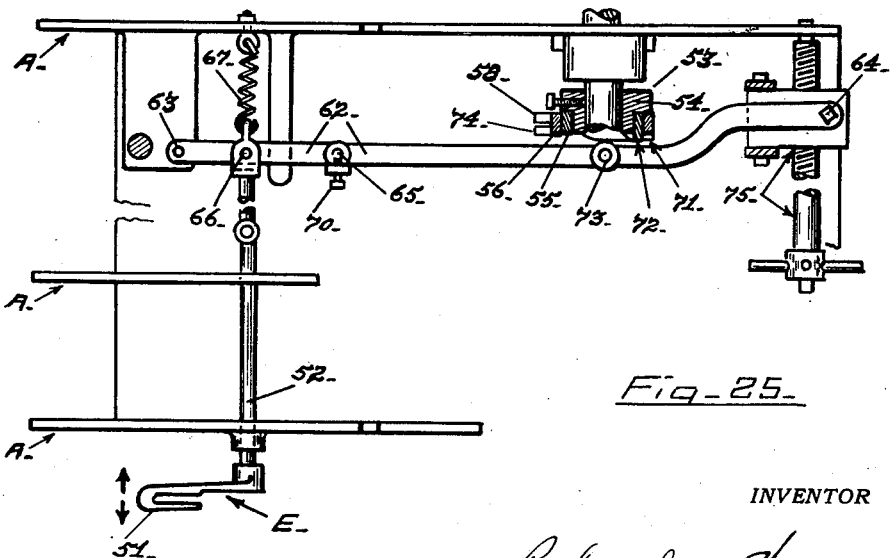
Fig_25.
INVENTOR
Robert Chester Winders

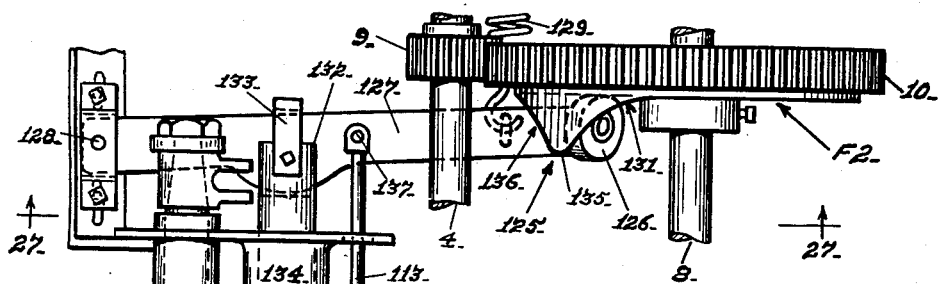
Fig_26_
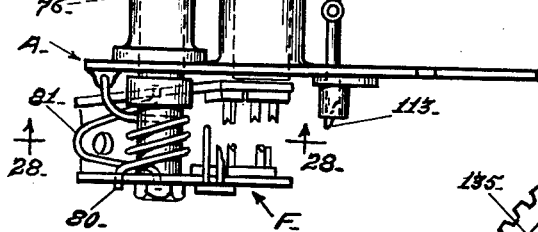
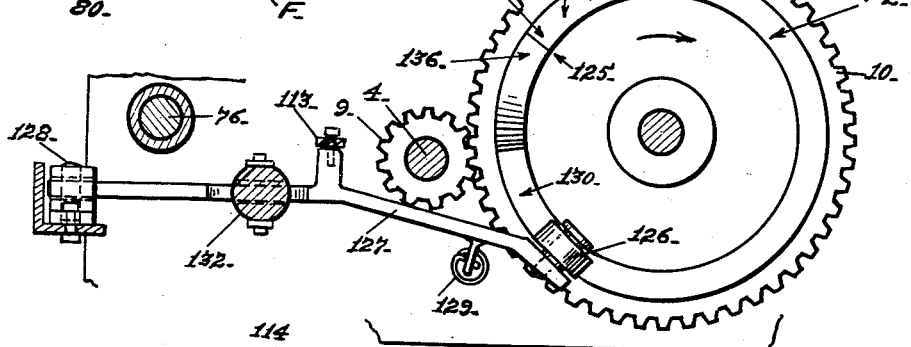
Fig_27_
Fig_29_   Fig_32_
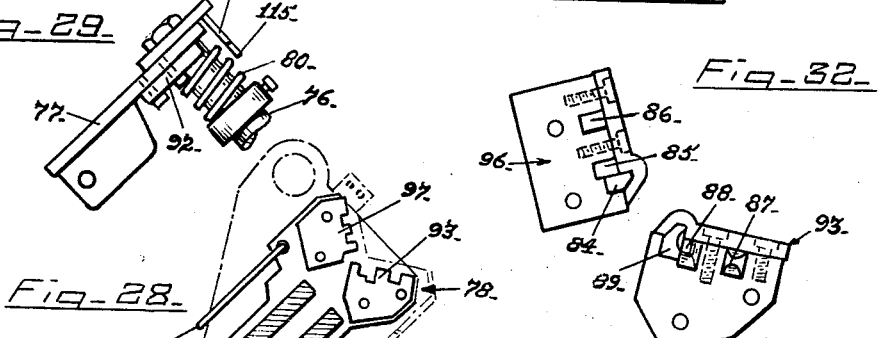
Fig_28_   Fig_33_
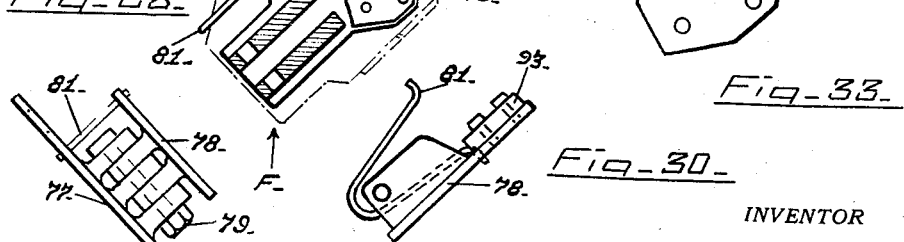
Fig_30_
Fig_31_
INVENTOR
Robert Sheeler Winders INVENTOR
Robert Chester Winders

Patented July 11, 1939

2,165,600

UNITED STATES PATENT OFFICE 2,165,600

COIL SPRING FORMING MACHINE

Robert Chester Winders, Huntington Park, Calif.

Application December 3, 1937, Serial No. 177,844

21 Claims. (Cl. 140—78)

This invention relates to and has for an object the provision of an efficient machine for forming complete coiled springs having especially formed ends to facilitate connecting a plurality of such springs together as is the practice in the manufacture of inner spring mattresses, seats, cushions and other upholstery.

An important object of the invention is to provide a coil spring forming machine of the character described which is entirely automatic in operation and will produce a large number of completed coiled springs in a comparatively short time with the terminals of the end coils of each spring provided with formations constituting guide loops and hooks for co-operation with tie elements used to connect a group of said springs together.

A further object is to provide a machine of the character described which will operate automatically when a predetermined number of consecutive coils have been formed, to substantially simultaneously and with one operation of die elements, sever the wire between predetermined coils and bend the wire ends to form the loops and hooks as aforesaid, whereby this one operation provides like end formations for the completed spring and one end of the partially formed following spring.

A further object is to provide a machine of the character described having simple and effective means for automatically varying the diameter and the helix angle of the coils during the formation thereof whereby, for example, a plurality of completed springs of the double volute or hour glass type may be continuously produced by continuously feeding through the machine the wire for forming said springs.

The invention further resides in the particular combination and relative arrangement and construction of a plurality of cam operated devices for automatically controlling the operation of the machine and causing completed springs to be rapidly and successively formed upon starting the machine and thereupon continuously feeding thereto the wire from which the springs are formed.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

In the drawings:

Figure 1 is a top plan view of a coil spring forming machine in accordance with this invention.

Figure 2 is a front elevation of the machine shown in Figure 1 with certain parts omitted for clarity of illustration.

Figure 9 is an enlarged section on line 9—9 of Figure 1 showing the laterally adjustable wire guide and "back-stop" means.

Figure 10 is an enlarged section on line 10—10 of Figure 1 and a relative section on line 10—10 of Figure 9.

Figure 11 is a sectional view taken on the plane of line 11—11 of Figure 3.

Figure 12 is a sectional view on line 12—12 of Figure 3.

Figure 13 is a section on line 13—13 of Figure 3.

Figure 14 is a sectional view of the sectional and adjustable cam for controlling the wire feed means.

Figure 15 is an elevational view of one part of the cam shown in Figure 14.

Figure 16 is an elevational view of the other part of the cam shown in Figure 14.

Figure 17 is a fragmentary detail plan view of the cam operated means for controlling the movement of one of the coil forming rollers to vary the diameter of the coils.

Figure 18 is a part sectional and part elevational view, with certain elevational parts omitted for clearness, of the cam means of Figure 17 taken on the plane of line 18—18 of Figure 17.

Figure 19 is a front elevation of the sectional and adjustable cam for controlling and operating the means for producing a variable helix angle in the coils.

Figure 20 is a side elevation of one section of the cam shown in Figure 19.

Figures 21 and 22 are side elevations of other sections of the cam shown in Figure 19.

Figure 23 is a fragmentary detail plan view particularly showing the cam in Figure 19 and associated mechanism.

Figure 24 is a vertical section of the means shown in Figure 23 taken on line 24—24 of Figure 23.

Figure 25 is a sectional view on the plane of line 25—25 of Figure 24.

Figure 26 is a fragmentary detail plan view of the cam and associated mechanism for controlling the wire severing and hook forming means.

Figure 27 is a sectional view of the cam means of Figure 26 taken on the plane of line 27—27 of Figure 26.

Figure 28 is a sectional view of the wire severing and hook forming die on the plane of line 28—28 of Figure 26.

Figure 29 is a side view of the outer half of the die with the die teeth removed.

Figure 30 is a side view of the inner half of the die with the die teeth removed.

Figure 31 is a bottom plan of the die showing the hinged joint.

Figure 32 is a back elevation of one of the die blocks and die teeth on the outer half of the die.

Figure 33 is a front elevation of one of the die blocks and die teeth on the inner half of the die showing, in conjunction with Figure 32 the relation of the wire severing teeth.

The embodiment of this invention shown in the accompanying drawings comprises a frame A, a main drive means B, wire feeding means C, operated and controlled by cam means C1, coiling means D through which the wire is fed, cam means D1 for controlling and operating said means D for varying the diameter of the coils, helix angle producing means E associated with the means D, cam means E1 for operating and controlling the means E to produce helical coils of varying helix angles, die means F for simultaneously severing the wire and forming loop and hook ends on the terminals of each spring, cam means F1 for moving said die means into and out of operative position, cam means F2 for actuating the die means to sever the wire and form the hooks on the severed ends.

In accordance with this invention the means and devices aforementioned are all driven from the main drive means B and upon starting the machine, coiled springs will be continuously formed as long as the wire is fed into the machine. It should be noted that each spring is completed and ready for use and that the continuous operation makes possible a relatively great output of complete springs in short periods of time and entirely automatically. No manual adjustments or operations are required throughout the repeated cyclical operation for forming a completed spring.

It should be noted that the machine of this invention is primarily designed to produce double volute or hour glass shaped springs such as popularly used in making bed springs, "inner-spring" mattresses and cushions and other "spring filled" upholstery, yet it is to be understood that the machine may be employed for making single volute and helical springs and is subject to such uses upon making minor adjustments which will be readily apparent to those skilled in this art.

Drive means

Figure 3:
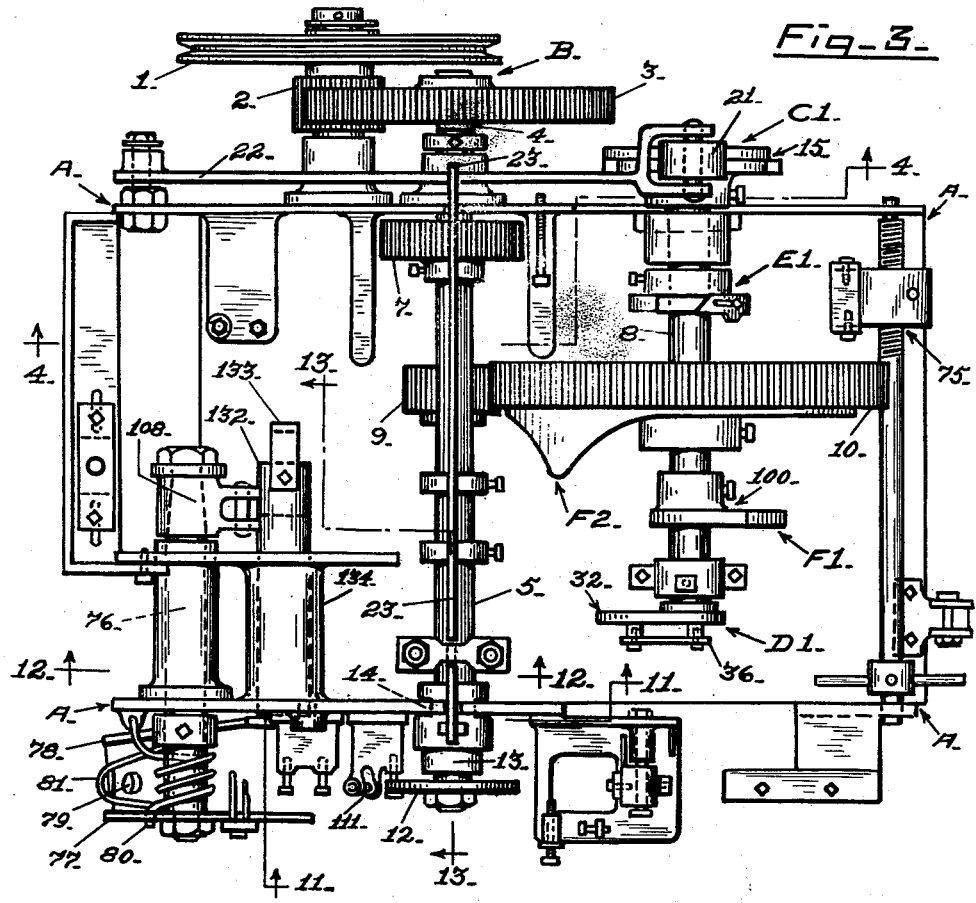
Figure 3 is a top plan view similar to Figure 1 but with certain parts omitted to emphasize the frame structure and certain operating elements of the machine.
Figure 4:
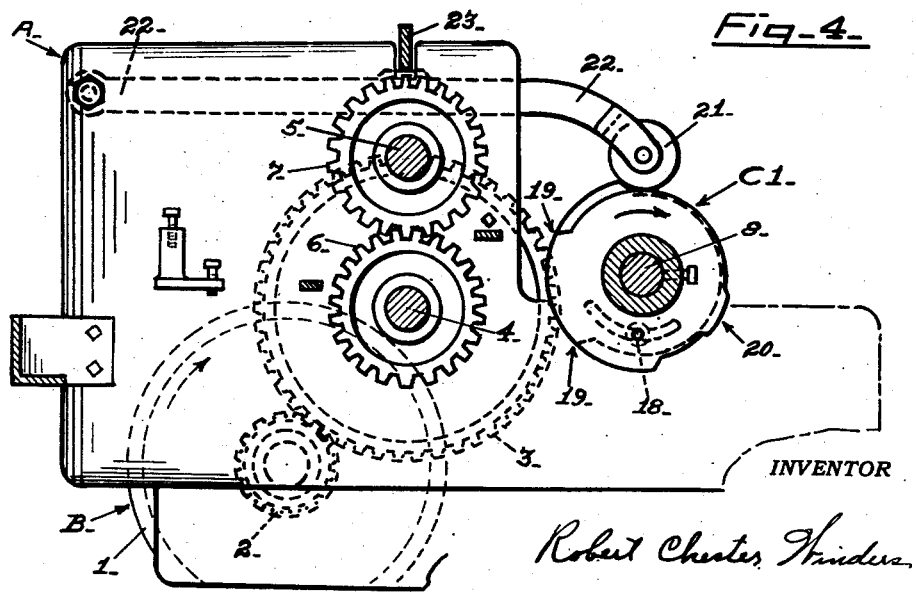
Figure 4 is a sectional view taken on the plane of line 4—4 of Figures 1 and 3.

The drive means here employed and designated B, (see Figures 1, 2 and 3) comprises a pulley 1 driven by a suitable prime mover or power source not shown so as to rotate a pinion 2 which drives gear 3 mounted on a shaft 4 extending across and journalled in the frame A. A similar shaft 5 is mounted above shaft 4 and driven by gears 6 and 7. Arranged in the frame to one side of the shafts 4 and 5 is a cam operating shaft 8 driven from the shaft 4 by the pinion 9 and gear 10.

Wire feeding means

The wire feed means C (Figures 1, 2, 5, 6 and 7) comprises opposed rollers 11 and 12 mounted on and rotating with the shafts 4 and 5 and adapted to frictionally grip the wire W and force it to and past the coiling means D. The wire is fed to said rollers from a reel not shown.

The upper shaft 5 carrying the roller 12 is vertically adjustable sufficiently to grip or release the wire, as the adjacent bearing 13 is mounted in a slot 14 (Figure 11) of the frame A. These feed rollers 11 and 12 are inoperative to feed the wire until forced together so as to frictionally grip the wire.

Cam means for controlling the wire feeding means

The cam means C1 comprises a sectional adjustable cam 15 (Figures 14, 15 and 16) fixed on the shaft 8 and made of similar circular sections 16 and 17 adjustably secured together by the fastening 18. This adjustment permits of readily regulating the operation of the wire feed means without dismantling the cam or necessitating the substitution of a modified cam. The cam is provided with two operating surfaces 19 and 20 of which the former forces the feed rollers closer together than the latter as will be later explained. These cam faces 19 and 20 operate to engage a roller 21 on a lever 22 pivoted on the frame A whereby when lifted and lowered by the said cam it will rock a lever 23 lying thereon.

The lever 23 is fulcrumed at 24 (Figures 12 and 13) between its ends and the end which swings downward, as the lever 22 is raised, presses on the bearing 13 which is adjacent the upper roller 12 whereby to force said roller towards the roller 11 and thereby frictionally grip the wire. At the end of the spring forming operation, that is, at the time that the die means F operates, the cam surface 20 engages the roller 21 and as this surface has less radial extent than surface 19, the levers 22 and 23 are not moved sufficiently to cause the rolls to grip the wire as tightly as when the cam surface 19 is operative. Thus, the wire will be given "slipping" feed by the feed rollers 11 and 12 sufficient to aid but compensate for the longitudinal pull on the wire during crimping action of the die, for the purpose of preventing distortion of the partially formed spring in the coiling means. The cam surfaces 19 and 20 are circumferentially spaced so as to provide a rest period when the cam does not operate to cause the rollers 11 and 12 to grip and feed the wire while the spring is being severed and crimped, following which the cam surface 19 again comes into action.

Coiling means

The wire coiling means D here employed comprises the peripherally grooved guide rollers 25 and 26 on fixed axes on the frame A. The wire engages and moves past the upper side of the roller 25 and the lower side of the roller 26 as it feeds from the rollers 11 and 12. Mounted forwardly of the roller 26 on an adjustable fixed axis is grooved roller 27, the upper edge of which is above the plane of the lower side of roller 26 so that the wire will extend over said upper side and engage in the groove thereof.

Arranged to move arcuately relative to the roller 27 is a grooved bending roller 28 mounted on one end of a bell crank or rocker member 29 pivoted at 30 and 31 on the frame A. The feed rollers 11 and 12 and rollers 25, 26, 27 and 28 are mounted in alignment in a common vertical plane to prevent lateral distortion of the wire as it is fed to and coiled by the rollers 27 and 28. After the wire passes over the top of roller 27 it extends forward and downwardly against and past the upper edge of the roller 28, the grooves in said rollers preventing lateral displacement of the wire. As the wire is forced between said rollers 27 and 28 it will be bent to form substantially flat coils having little or no helix angle and it is seen that the diameter of the coils thus formed will depend on the spacing of the rollers 27 and 28. By moving the roller 28 towards and away from roller 27 during the feeding of the wire against and past said rollers the diameter of the coils may be varied as desired.

Cam means for varying the diameter of the coils

The cam means D1 comprises a sectional adjustable cam 32 as particularly shown in Figures 17 and 18 and fixed on the cam operating shaft 8. This cam has its main section or body 33 formed with meeting arcuate cam surfaces 34 and 35 and provided with a section 36 which is radially adjustably held thereon by means of suitable fastening means 37. The cam section 36 is provided with a substantially semicircular cam surface 38 spaced inwardly of surfaces 34 and 35. The cam surfaces 34 and 35 are circumferentially spaced and located so that at the time that the wire feed means has advanced sufficient wire to form a nearly completed or a completed flat coil as an end coil of the spring to be formed, the surface 34 will engage the roller 39 on the lower side of a lever 40 pivoted at 41 on the frame A and lift said lever progressively with continued rotation of the cam until the "high" point 42 at the juncture of surfaces 34 and 35 is reached. As the lever 40 is lifted or rocked by cam surface 34 it rocks lever 43 through the adjustable screw 44 mounted on the lever 43. Lever 43 is adjustably secured by means of the slotted head 45 and set screw 46 to the upper end of bell crank 29 carrying the bending roller 28. Thus as the levers 40 and 43 are rocked as aforesaid the bell crank 29 moves with lever 43 so as to progressively swing the roller 28 towards roller 27 whereby to shorten the bending radius and reduce the diameter of the coils. The surface 34 of the cam 32 is such that it will move the levers 40 and 43, bell crank 29 and roller 28 progressively inwardly towards roller 27 from the time the flat end coil is formed or nearly so, until one volute series of coils of gradually decreasing diameter is formed. When the diametrically smallest coil of the series is formed, the cam surface 35 encounters roller 39 and the lever 40 is progressively lowered by the spring action of the coil being formed and thereby rocks lever 43 and bell crank 29 so that the roller 28 is gradually moved away from roller 27. This will cause coils of increasing diameter to be progressively formed until the "flat" end coil completes the double volute or hour glass shaped spring and a part, at least, of another "flat" coil as the beginning of the next spring are finally formed, at which time, the roller 39 is disengaged from the surface 35 and rides on the inoperative or rest surface 47 of the cam and remains in contact therewith until the die means F severs and crimps the wire and the feeding and bending actions are resumed, whereupon the surface 34 will again engage cam roller 39 and repeat the cycle as previously described.

It should be noted that the cam surface 38 is adapted to engage a roller 48 on one end of a lever 49 pivoted between its ends on lever 40. The other end of lever 49 abuts on the adjustable stop 50 on the lever 40. These parts may be adjusted to calibrate the action of the cam 32 and to vary its action to provide for changing the diameter characteristics of the springs made with the machine.

Means for forming helix angles in the coils

The means E for forming helical coils comprises, as more especially shown in Figures 5, 6, 7 and 25, a U shaped member or hook 51 adapted to embrace the coils, as progressively formed, and movable axially of the coils during the forming thereof whereby to vary the helix angle throughout each coiled spring, by deflecting and deforming the wire thereof helically. The member 51 is fixed to one end of a bar 52 which is reciprocally mounted in the frame A.

Cam means for operating and controlling helix angle forming means

As particularly shown in Figures 19 to 25 inclusive, the cam means E1, includes a composite adjustable cam 53 operated by the shaft 8 and consisting of a tubular body 54 fixed to said shaft, a cam ring 55 adjustable on said body, and an outer cam ring 56 surrounding the ring 55. The ring 56 has cam projections 57 and 58 spaced apart on the outer periphery thereof. A lever 59 is pivoted at one end as at 60 to the frame A and carries a roller 61 on its other end for engaging the cam projections 57 and 58. Mounted below and parallel to lever 59 is a toggle lever 62 pivoted at its ends to the frame as at 63 and 64 and having the toggle joint 65 between its ends. The bar 52 carrying the hook member 51 is pivoted as at 66 to the lever 62 between the pivots 63 and 65 thereof whereby toggle movement of lever 62 will reciprocate said bar. A spring 67 tends to retract bar 52 and a spring 68 tends to urge lever 59 towards an adjustable stop 69 on the frame A. Movement of the lever 59 towards said stop is prevented by the cam projections 57 and 58 engaging the roller 61 on said lever. An adjustable stop 70 carried by the lever 62 engages the lever 59 to prevent movement of lever 62 in a direction which would extend the bar 52 and hook member 51 inwardly but allow free movement thereof outwardly against the pull of the spring 67. The lever 62 is operated to extend bar 52 and member 51 outwardly by contiguous cam projections 71 and 72 arranged on the cam rings 55 and 56 to engage roller 73 on lever 62. It should be noted that the cam projection 58 has an adjustable face plate 74 to change the action on the cam without necessitating replacing the cam. Other changes in the action of the cam to regulate the extent of movement of the helix angle forming member or hook 51 are accomplished by adjusting pivot 64 of lever 62 through the adjusting means 75, and by adjusting the stops 69 and 70 and by changing the relative positions of the cam rings 55 and 56 to alter the combined length of cams 71 and 72.

During the feeding and deforming of the wire for forming the first "flat" coil the member or hook 51 is sustained in the plane of the rollers 27 and 28 so that no lateral or axial deformation of the wire takes place by the roller 61 of lever 59 engaging the cam projection 57. As soon as the first "flat" coil is formed or nearly formed the roller 61 moves off of cam projection 57 and the spring 68 moves the lever inwardly from the stop 70 and against the stop 69. As the roller 61 moves off of the face of cam projection 57 the roller 73 on toggle lever 62 first encounters cam projection 71 on outer ring 56 and the lever is given an outward movement against its toggle joint 65 whereby the bar 52 near such joint is moved outward and the hook member 51 is moved correspondingly. The cam projections 71 and 72 are so formed that the hook member 51 is progressively forced outwardly from the plane of the grooved periphery of the forming rollers 27 and 28. This causes a helical deformation of the spirally coiling wire which varies with each coil due to the progressive movement of the member 51. The progressive magnitude of the helical deformation forms the variable helix pitch desired in the completed spring.

As the machine continues to operate the roller 73 engages a portion of projection 72 on the inner ring 55 while yet in contact with a contiguous part of cam 71 and the composite action of said cam projections forces the hook member 51 outwardly to the position of maximum helical deformation and this position is maintained by the action sustaining faces of said projections during the winding of the central coils of the spring.

As the machine continues to operate, after the smallest coils at the center of the spring are formed, the hook member 51 commences to retract as permitted by the "allowance action" of the cam projections 71 and 72 and the retracting action of the spring 67.

Thus the coils are formed for the remaining "half" of the double volute spring, with a progressively decreasing helical pitch ending in a "flat" coil having substantially no helical deformation. When the last helical coil is finished the roller 73 moves off of the cam projection 72 and at the same time the roller 61 on lever 59 is engaged by the cam projection 57 which thereby moves the lever 59 into engagement with the stop 70 whereby to sustain the toggle lever 62 in position holding the hook member 51 substantially in the plane of the rollers 27 and 28. As the machine continues to operate the last (flat) coil of the spring and at least a part of another "flat" coil, as the end of the next spring, are formed and the composite cam 53 sustains the levers 59 and 62 in such position until the "first" spring is severed and formed with the hook ends and the first coil of the next spring is completed, whereupon the cam projections 58, 71 and 72 again go through the cycle previously described.

Die means for severing the wire and crimping the ends of the springs

Figure 8:
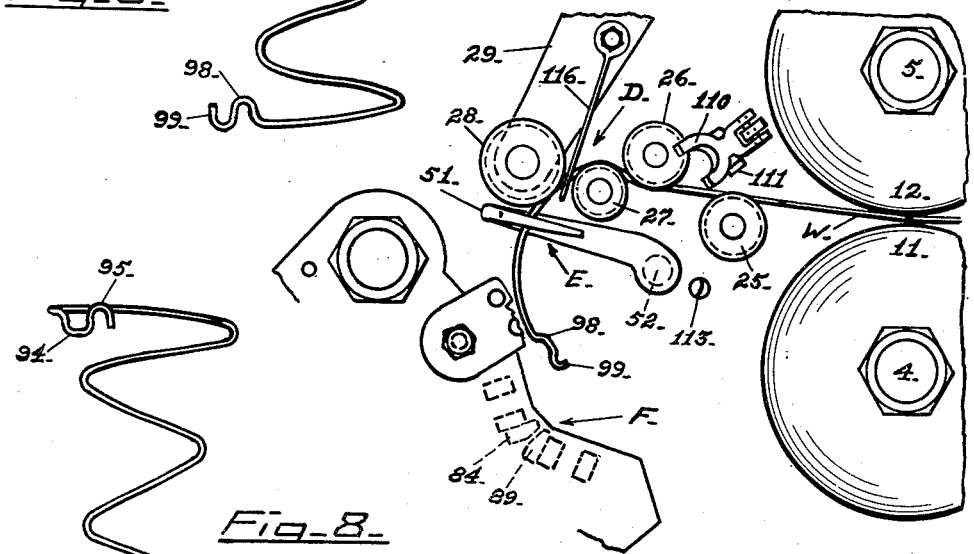
Figure 8 is an elevation of a coiled spring of this invention.
Figure 34:
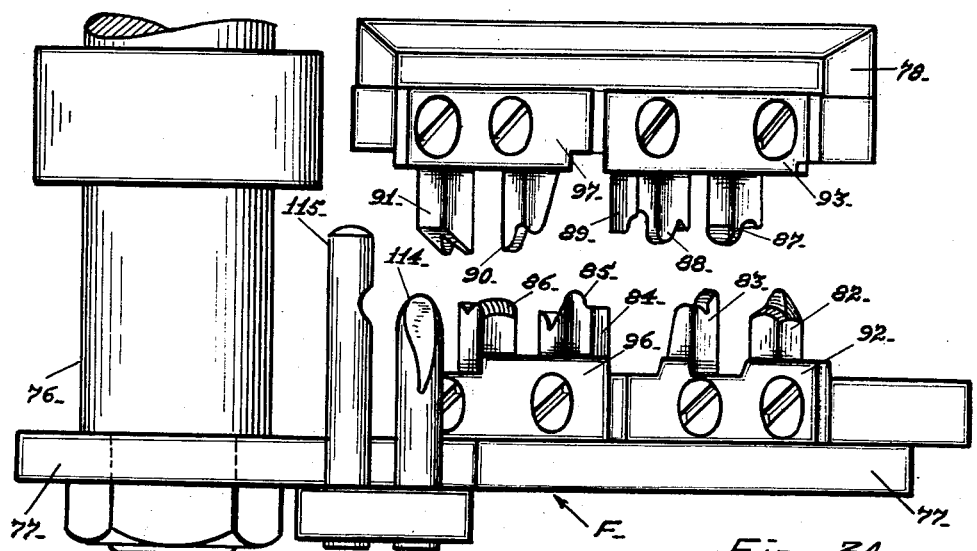
Figure 34 is an enlarged top plan view of the complete die.

The die means F (see Figures 5, 6, 7 and 28 to 34 inclusive) include a rotary shaft 76 carried by the frame A and supporting a jaw 77 to which a companion jaw 78 is hinged as at 79. These jaws are normally below the plane of the lower side of the spring being wound by the forming rollers and are so held by a spring 80 coiled around shaft 76 and having terminals fixed to the frame A and the outer jaw 77. Upon appropriate turning of the shaft 76 as by the operation of the cam means F1, the jaws 77 and 78 are moved upwardly into position to receive the coils of the springs. Normally the hinged jaw 78 is held spaced from the jaw 77 by a spring 81, but is adapted to be moved towards the jaw 77 by the cam means F2, whereby die members (Figure 34) 82, 83, 84, 85 and 86 on the jaw 77 and similar die members 87, 88, 89, 90 and 91 on the jaw 78 will co-operate to sever and crimp the wire. The die members 82 and 83 are supported by a block 92 on the jaw 77 and co-operate with the die members 87 and 88 on a block 93 carried by the jaw 78, to form a U shaped loop 94 (Figure 8) adjacent but spaced inwardly of the end of the last coil of the spring being completed, and an inverted U shaped hook 95 contiguous with said loop and at the end of said last coil. At the same time die members 85 and 86 on a block 96 carried by the jaw 77 cooperate with the die members 90 and 91 on a similar block 97 on jaw 78 to form on the first coil of the following spring, a loop 98 and hook 99 (Figures 6, 7 and 8) identical with those on the completed spring. It will be noted that the die members 84 and 89 respectively carried on the die supporting blocks 96 and 93 meet so as to sever the wire between the end coils of contiguous springs before the other die members come together sufficiently to crimp the loops and hooks in the wire. The crimping die members have notched outer ends which receive the wire before the severing dies come together, whereby to hold the wire against displacement from the crimping action of the die members. It should be noted that the loops and hooks formed on the ends of the springs extend axially thereof to facilitate the securing of a plurality of the springs together as is the practice in making inner spring mattresses, cushions and the like.

Cam means for moving the die means into and out of operative position

Figure 35:
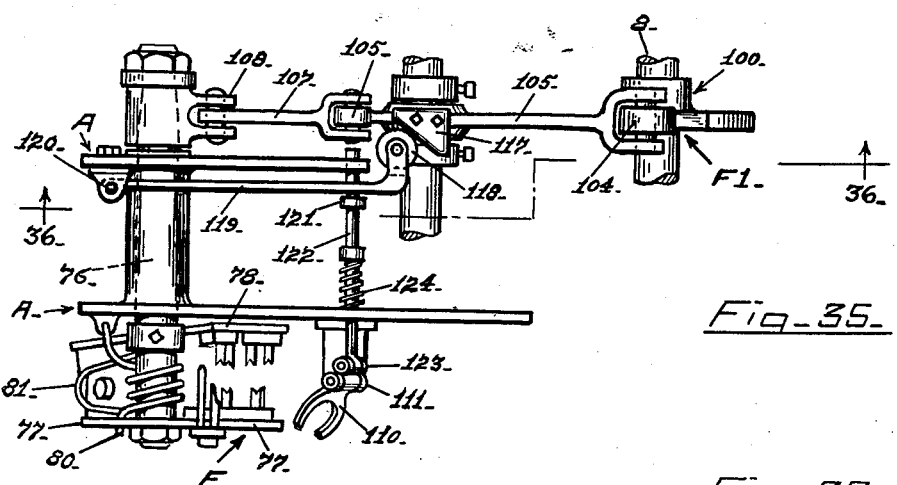
Figure 35 is a fragmentary detail plan view of the cam and associated mechanism for effecting movement of the die into and out of operating position with respect to the formed coils.
Figure 36:
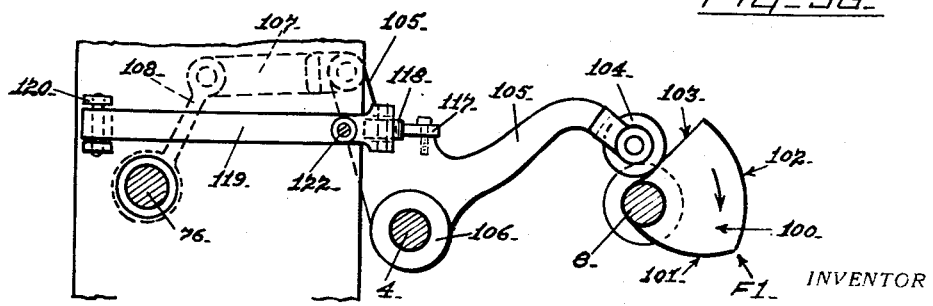
Figure 36 is a sectional view of the cam means of Figure 35 taken on the plane of line 36—36 of Figure 35.

As shown in Figures 35 and 36 the means F1 for moving the jaws 77 and 78 of die means F into and out of operative position comprises a cam 100 mounted on shaft 8 and provided with peripheral operating surfaces 101, 102 and 103 coacting with a roller 104 on one end of a bell crank 105 pivoted at 106 free to oscillate on shaft 4. A link 107 connects the other end of the bell crank 105 with a crank arm 108 on shaft 76 whereby to rotate the latter when the cam 100 rocks said bell crank.

Figure 5:
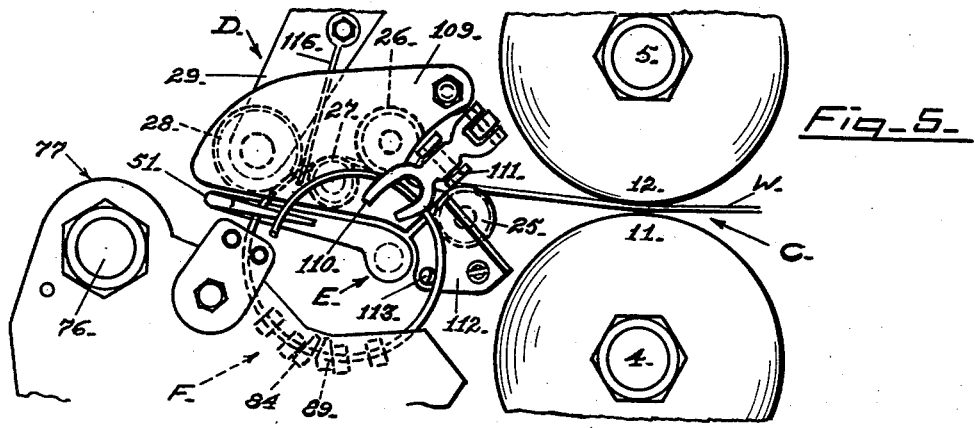
Figure 5 is an enlarged fragmentary front elevation showing the position of the coil forming elements when a spring is nearing completion, the spring being broken away.
Figures 6, 7:
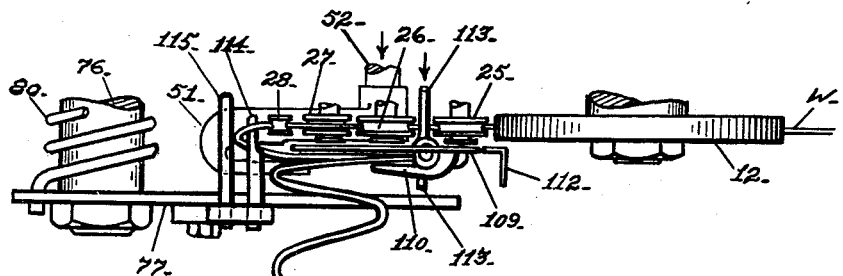
Figure 6 is a fragmentary top plan view showing the parts as when in the position of Figure 5 and the nearly completed spring, the die elements being omitted and the movable coiling roller and guide plates being broken away for clarity of illustration.
Figure 7 is an enlarged fragmentary front view similar to Figure 5 with the guard plates removed and showing the parts after a completed spring has been cut off and the next spring is being formed.

When the last coil of the spring being completed and a part of the end coil of the following spring are formed, the cam surface 101 engages the roller 104 and thereby rocks the bell crank 105 so that through the link 107 and crank arm 108 the shaft 76 is rotated whereby to raise the die jaws 77 and 78 into position shown in Figure 5, with the coil to be severed and crimped lying in the notched ends of the die teeth as hereinbefore described. The die jaws are sustained in such position by the action of the cam face 102 and the cam face 103 allows the spring 80 to return the jaws to the out-of-the-way position below the coiling means as shown in Figure 7, as the final operation of the machine cycles.

The spring coil engaged with the die members on the die jaws 77 and 78 as aforesaid, is held in such position by a frame carried guide plate 109 (Figures 5 and 6) and a holder member 110 pivoted at 111 between its ends on the frame A. The plate 109 is disposed in front of the guide and coiling rollers 26, 27 and 28 to prevent the coils from becoming entangled therewith and to guide the coils between the die jaws. The holder 110 is movable into and out of position (Figures 5, 6, 7 and 35) overlying the wire coil which lies upon the outer face of the plate 109. When in holding position this holder and the plate 109 prevent axial movement of the spring and coils during the severing and crimping operation of the die. Another guard plate 112 (Figures 5 and 6) is disposed below the plate 109 and in front of roller 25 for the same purpose as plate 109 and cooperates with a guide rod 113 which is extended outwardly from the frame A through an opening in plate 112 as will be later described, so that the wire of the coil in the die means will extend "around" the guide member 113 to prevent deflection of the coil in one direction transversely of the axis thereof. The opposite side of the coil will extend between guide pins 114 and 115 fixed on the die jaw 77, as shown in Figures 5 and 6, to prevent lateral deflection in the other direction. The coil being cut and crimped is further guided into and held in the desired position by a guide arm 116 (Figures 2, 5 and 7) depending from the crank arm 29 and positioned between the rollers 27 and 28 and exterior of the groove plane thereof.

The cam means F1 has a cam 117 on the bell crank 105 (Figures 35 and 36) which, when the cam face 101 of cam 100 is operating to move the die means F into operating position, will engage roller 118 on a lever 119 pivoted at 120 to the frame A. When thus moved the lever 119 will engage a stop collar 121 on a push rod 122 pivoted at 123 to the wire coil holder 110 whereby to swing the latter into its operative position overlying the coil of the spring engaged with the die jaws as shown in Figures 5 and 6. A spring 124 operates to return the holder 110 and operating means therefore to normal position.

*Cam means for operating the die means to sever and crimp the coils*

As shown in Figures 26 and 27 the cam means F2 comprises a V shaped ring cam member 125 extending axially from one face of the gear 10 and adapted to be moved into and out of contact with a roller 126 on the end of a lever 127 pivoted at 128 on the frame A. This lever is retracted by a spring 129 whereby the roller 126 is held against the face 130 of the cam F2.

When the means F1 has operated as aforesaid to move the die jaws 77 and 78 into position to properly engage the coil to be severed and crimped, the cam surface 131 of the cam 125 will engage the roller 126 and rock the lever 127 and push outwardly the plunger 132 connected by the clevis 133 with said lever. The plunger 132 is slidably supported in a suitable frame carried guide 134 and when pushed outwardly will engage the hinged jaw 78 of the die means F whereby to move said jaw towards the jaw 77, and thereby cause the die members 82, 83, 84, 85, 86, 87, 88, 89, 90 and 91 to first cut and then crimp the wire as hereinbefore more fully described. The severing of the wire takes place while the roller 126 is riding outward on the cam face 131 and the crimping action occurs when the roller 126 is adjacent or on the "high" point 135 of the cam 125. When the roller 126 rides off the high point 135 onto the other cam face 136 the spring 129 returns the lever 127 and plunger 132 to normal position and the spring 81 forces the jaws 77 and 78 apart whereby to release the completed spring and the crimped end of the first coil of the spring next to be formed. At the time that plunger 132 is forced outward, the guide rod 113 (Figure 26) which is pivoted as at 137 to the lever 127 is forced outward through the guard plate 112 (Figure 5) into position to engage the inner side of the coil being severed and crimped to prevent lateral displacement thereof as previously described. This bar 113 is returned to out-of-the-way position by the spring 129 at the same time that the lever 127 and plunger 132 are retracted. It should be noted that the helix angle forming hook member 51 (Figures 6 and 25) is free to yield outwardly responsive to the outward "pull" caused by the action of the crimping dies, this yielding being permitted by the toggle lever 62 and spring 67 connected therewith.

As a means for guiding and leading the wire free from kinks and bends, from the source of supply not shown, to the feed rolls 11 and 12 and for also preventing the wire from being twisted or distorted or of slipping "backward" between the feed rolls due to the stresses set up by the bending or coiling rollers and the severing and crimping dies, I provide a wire straightening device 138 (Figures 1 and 2) and a laterally adjustable guide device 139 (Figures 1, 2, 9 and 10) through which the wire passes to said feed rolls. The wire straightening device 138 is of standard form and requires no further description.

The laterally adjustable guide means 139 is best shown in Figures 1, 2, 9 and 10 and comprises an angle bracket 140 fixed on the frame A between the wire straightening device 138 and the rollers 11 and 12. Fixed on this bracket is an anvil 141 having a wire guiding eye 142 through which the wire passes. From the eye 142 the wire passes over and upon the anvil and then through a groove 143 in the lower side of a guide arm 144 pivoted at 145 on the bracket 140. This guide arm prevents lateral displacement of the wire as it passes between opposed peripherally grooved rollers 146 mounted on upright axes on a horizontal arm 147. This arm is pivoted as at 148 at the end thereof, opposite that carrying the rollers, to the bracket 140. The free end of the arm 147 and the rollers 146 is forced laterally outwardly by a spring 149 and may be forced inwardly against the tension of said spring by an adjusting screw 150. This arrangement permits of positioning the rollers 146, so as to place the wire under tension and exert straightening forces thereon and also cause the wire to be angularly fed to the feed rollers 11 and 12, all for the purpose of preventing the stresses set up in the wire (being fed from a source not shown) by the action of the feed and coiling rollers and die, from twisting and distorting the spring. To prevent back lash or slipping of the wire when the die releases the severed wire, a blade 151 is pivoted at its upper end as at 152 to the bracket 140 to swing in a spring urged arc into contact with the wire on the anvil 141. This blade will not resist the feed of wire from the anvil to the feed rolls 11 and 12 but will swing so as to bind the wire tightly against the anvil incident to but a slight back slipping of the wire, whereby to prevent the wire from slipping back from between the coiling rollers or otherwise to an appreciable extent.

I claim:

1. A machine for forming coiled springs comprising means for forming wire into coils, and means operating automatically when a predetermined number of coils has been formed for severing the wire in a predetermined coil and deforming and extending the ends of the wire axially of and inwardly from the coils, said last named means including opposed cutting dies, pairs of opposed deforming dies adjacent and on each side of said cutting dies, and means for substantially simultaneously applying all of said dies to the wire.

2. A machine for making coiled springs comprising a frame, a pair of coiling rollers arranged thereon to form into coils the wire which is forced between and against said rollers, means for continuously forcing wire between and past said rollers, means for moving one of said rollers in an arc towards and away from the other thereof, means for producing a helix angle in the coils formed by said rollers, including a coil embracing hook movable relative to said rollers for deflecting the wire axially of the coils during the forming of each thereof, and means operating automatically for moving said hook towards and away from said rollers while the wire is embraced by said hook.

3. A machine for making coiled springs comprising a frame, coiling means arranged thereon to form wire into coils including rollers one of which is movable towards and away from the other, means for moving said one roller towards and away from said other roller, means for producing a helix angle in the coils formed by said rollers, including a coil engaging hook movable towards and away from said rollers for deflecting the wire axially of the coils during the forming of each thereof, and means for reciprocating said hook relative to said rollers and in the direction of the axis of said coils.

4. A machine for forming coiled springs comprising a frame, means thereon operating responsive to the feed of wire thereagainst for forming coils, and means operating automatically when a predetermined number of coils has been formed for substantially simultaneously angularly deforming and severing the wire between predetermined coils and forming identical hooks and open loops adjacent the ends thus formed in severing the wire with said ends extending axially and inwardly of said coils.

5. A machine for forming coiled springs comprising a frame, means thereon operating responsive to the feed of wire thereagainst for forming coils, and means operating automatically when a predetermined number of coils has been formed for angularly deforming and severing the wire between predetermined coils and forming identical hooks on the ends thus formed, with the ends of said hooks extending inwardly and axially of the coils.

6. A machine for forming coiled springs comprising a frame, means thereon operating responsive to the feed of wire thereagainst for forming coils, and means operating automatically when a predetermined number of coils has been formed for severing the wire between predetermined coils and bending the ends thus formed into like sinuous portions whereby each spring so produced has identical sinuous portions at its ends with said ends extending inwardly and axially of each spring.

7. A machine for forming coiled springs comprising means operating automatically for continuously coiling wire which is fed to and past such means, means for feeding wire to and past said coiling means, and means operating automatically when a predetermined number of consecutive coils have been formed, for effecting in one operation, the severing of the wire between predetermined coils and the formation of like open loops extending axially of the coils and opening outwardly thereof on the ends thus severed, whereby each spring has identically formed outwardly opening loops at the ends thereof.

8. A machine for forming coiled springs, comprising means operating automatically for continuously coiling wire which is fed to and past such means, means for feeding wire to and past said coiling means, and means operating automatically when a predetermined number of consecutive coils have been formed for effecting in one operation the severing of the wire between predetermined coils and the formation of like sinuous portions at the ends thus severed.

9. A machine for forming coiled springs comprising means operating automatically for continuously coiling wire as the wire is fed thereto, means for feeding wire to said coiling means, and means operating automatically when the last coil necessary to form a spring having a predetermined number of coils and at least a part of the first coil of the following spring are formed, for substantially simultaneously severing the wire between said first and last coil and sinuously deforming in a direction substantially axially of the coils, the ends thus formed.

10. A machine for forming coiled springs comprising means operating automatically for continuously coiling wire as the wire is fed thereto, means for feeding wire to said coiling means, and means operating automatically when the last coil necessary to form a spring having a predetermined number of coils and at least a part of the first coil of the following spring are formed, for substantially simultaneously severing the wire between said first and last coil and sinuously deforming in a direction substantially axially of the coils, the ends thus formed, and means for engaging and preventing the coils from being otherwise distorted during said severing and end deforming operation.

11. A machine for forming coiled springs comprising means operating automatically for continuously coiling wire as the wire is fed thereto, means for feeding wire to said coiling means, and means operating automatically when the last coil necessary to form a spring having a predetermined number of coils and at least a part of the first coil of the following spring are formed, for substantially simultaneously severing the wire between said first and last coil and sinuously deforming in a direction substantially axially of the coils, the ends thus formed, and means providing for the slipping of the wire relative to said feed means incident to the longitudinal pull on the wire occasioned by the severing and end deformation operation.

12. A machine for forming coiled springs comprising means operating automatically for continuously coiling wire as the wire is fed thereto, means for feeding wire to said coiling means, and means operating automatically when the last coil necessary to form a spring having a predetermined number of coils and at least a part of the first coil of the following spring are formed, for substantially simultaneously severing the wire between said first and last coil and sinuously deforming in a direction substantially axially of the coils, the ends thus formed, and means providing for the slipping of the wire relative to said feed means incident to the longitudinal pull on the wire occasioned by the severing and end deformation operation, and means actuated by contact with the wire feeding to the coiling means for preventing slipping of the wire in a direction opposite that in which the wire is fed to said coiling means.

13. A machine for forming coiled spring comprising relatively movable coiling rollers between, against and past which wire is moved to form coils, means for feeding wire against and past said coiling rollers, means for bodily moving one roller towards and away from the other roller during the formation of the coils for varying the diameter of said coils, a member for helically deforming the coils movable axially of said coils into and out of the plane of the portions of the coiling rollers which engage the wire, means for reciprocally moving said last named member axially of and in engagement with the coil being formed by said coiling rollers for helically bending said coil, a die means normally disposed to one side of the springs being formed and being operable to sever the wire and deform the ends thus formed in one operation, means automatically moving said die means into position to sever and deform the wire when the last coil of one spring and a part of the first coil of the next spring are formed, means automatically operating said die means to sever and deform the wire when said die means is disposed in said operative position and means for automatically moving the die means into said out-of-the-way position following the severing and deforming operation thereof.

14. A machine for forming coiled springs comprising relatively movable coiling rollers between, against and past which wire is moved to form coils, means for feeding wire against and past said coiling rollers, means for bodily moving one roller towards and away from the other roller during the formation of the coils for varying the diameter of said coils, a member movable axially of said coils into and out of the plane of the portions of the coiling rollers which engage the wire, means for reciprocally moving said last named member axially of and in engagement with the coil being formed by said coiling rollers for helically bending said coil, a die means normally disposed to one side of the springs being formed and being operable to sever the wire and deform the ends thus formed in one operation, means automatically moving said die means into position to sever and deform the wire when the last coil of one spring and a part of the first coil of the next spring are formed, means automatically operating said die means to sever and deform the wire when said die means is disposed in said operative position and means for automatically moving the die means into said out-of-the-way position following the severing and deforming operation thereof, and means for rendering said wire feed means operative to allow the wire to slip therethrough during the severing and deforming operation of said die means.

15. A machine for forming coiled springs comprising relatively movable coiling rollers between, against and past which wire is moved to form coils, means for feeding wire against and past said coiling rollers, means for bodily moving one roller towards and away from the other roller during the formation of the coils for varying the diameter of said coils, a member movable axially of said coils into and out of the plane of the portions of the coiling rollers which engage the wire, means for reciprocally moving said last named member axially of and in engagement with the coil being formed by said coiling rollers for helically bending said coil, a die means normally disposed to one side of the springs being formed and being operable to sever the wire and deform the ends thus formed in one operation, means automatically moving said die means into position to sever and deform the wire when the last coil of one spring and a part of the first coil of the next spring are formed, means automatically operating said die means to sever and deform the wire when said die means is disposed in said operative position, means for automatically moving the die means into said out-of-the-way position following the severing and deforming operation thereof, means for rendering said wire feed means operative to allow the wire to slip therethrough during the severing and deforming operation of said die means, and means for preventing a backward movement of said wire relative to said feed means when the wire is severed.

16. A machine for forming coiled springs comprising means for automatically and continuously coiling wire which is fed thereto, means for feeding wire thereto, die means for severing and deforming the wire between the last coil of a completed spring and the first coil of the following spring, means normally holding said die means to one side of the coils being formed by said coiling means, means operating automatically when said first and last coils are formed for moving said die means into engagement with the wire between said first and last coils, means operating automatically when said die means is in engagement with said wire for operating said die means to sever the wire and deform the ends thus formed in one operation, and means for returning the die means to an inoperative position to one side the forming path of said coils upon completion of said severing and deforming operation.

17. A machine for forming coiled springs comprising means automatically and continuously coiling wire which is fed thereto, means for feeding wire thereto, die means for severing and deforming the wire between the last coil of a completed spring and the first coil of the following spring, means normally holding said die means to one side of the coil being formed by said coiling means, means operating automatically when said first and last coils are formed for moving said die means into engagement with the wire between said first and last coils, means operating automatically when said die means is in engagement with said wire, for operating said die means to sever the wire and deform the ends thus formed in one operation and means for returning the die means to inoperative position to one side of the forming path of said coils, upon completion of said severing and deforming operation, and means automatically regulating said feeding means to permit the wire to slip relative thereto during the operation of said die means and to restore said feeding means to operative feeding of the wire when said die means moves into inoperative position.

18. A machine for forming coiled springs comprising means operating automatically for continuously coiling wire as the wire is fed thereto, means for feeding wire to said coiling means, and means operating automatically when the last coil necessary to form a spring having a predetermined number of coils and at least a part of the first coil of the following spring are formed, for substantially simultaneously severing the wire between said first and last coil sinuously deforming in a direction substantially axially of the coils, the ends thus formed, and wire guide means through which the wire passes to said feeding means, including guide roller between and with which said wire engages, and means for adjusting said rollers transversely of the direction of feed of said wire.

19. In a spring coiling machine, a frame, means thereon for forming wire into coils, and means cooperating with said coiling means for helically distorting the wire as it is coiled, including a member reciprocally movable for engaging and deflecting the wire axially of the coils, a shaft reciprocably mounted on said frame and supporting said member, a lever pivoted at its ends on said frame and having a toggle joint between said ends, said shaft being pivoted to said lever, cam means for rocking said lever, and spring loaded means for opposing and controlling the movement of said lever, for reciprocating said shaft during operation of said cam means.

20. Die means for severing and deforming wire, including severing dies, and a plurality of deforming dies arranged on opposite sides of the severing dies for deforming in opposite directions the ends formed by the severing of the wire.

21. A machine for forming wire coils, including means for forming a plurality of consecutive wire coils, and means for severing the wire between predetermined coils and deforming in opposite directions the ends formed by the severing of the wire.

ROBERT CHESTER WINDERS.